United States Patent [19]
Zaffanella et al.

[11] Patent Number: 5,572,316
[45] Date of Patent: Nov. 5, 1996

[54] ANALOG SUN SENSOR

[75] Inventors: Carlo E. Zaffanella, Watertown; Robert C. Savoca, Ridgefield; Todd J. Bednarek, Wolcott, all of Conn.

[73] Assignee: EDO Corporation, Barnes Engineering Division, Shelton, Conn.

[21] Appl. No.: 350,683

[22] Filed: Dec. 7, 1994

[51] Int. Cl.$^6$ ............................ G01C 21/24; G01B 11/26
[52] U.S. Cl. ................................ 356/139.01; 250/203.4; 356/141.5
[58] Field of Search .................... 250/203.4; 356/139.03, 356/139.01, 141.5, 141.2

[56] References Cited

U.S. PATENT DOCUMENTS

| | | | |
|---|---|---|---|
| 3,205,361 | 9/1965 | Albus | 356/139.01 |
| 3,640,628 | 2/1972 | Jones. | |
| 3,728,715 | 4/1973 | Shapiro | 340/347 P |
| 4,756,617 | 7/1988 | Cain et al.. | |
| 4,806,747 | 2/1989 | Dunavan et al.. | |
| 4,810,870 | 3/1989 | Tsuno et al. | 250/203 R |
| 4,874,937 | 10/1989 | Okamoto. | |
| 4,999,483 | 3/1991 | Okamoto | 250/203.1 |
| 5,355,309 | 10/1994 | Eberhard et al. | 364/413.15 |

*Primary Examiner*—Stephen C. Buczinski
*Attorney, Agent, or Firm*—Parmelee, Bollinger & Bramblett

[57] ABSTRACT

Continuous positional information for an orbiting body such as a spacecraft, satellite, or the like with respect to a reference body, for example, the sun, is provided by a first continuous sensor which continually views the sun from the orbiting body and generates electrical signals which provide two axis information on the orbiting body's position. Analog sensors of this type have low accuracy because of transfer function non-linearity, degradation due to environmental aging, or radiation effects and others. A second periodic sensor is directed at the reference body to provide periodic positional updates. These updates are used as references to which the instantaneous output of a continuous sensor are compared so that error associated with the output of the continuous sensor can be eliminated to the accuracy of the calibration. The first continuous sensor preferably utilizes a first and second double triangle detector arranged to form first and second rectangles each having a slot aperture mounted thereon for projecting a line image normal to each rectangle. The first and second double triangle detectors are arranged orthogonally with respect to each other. An algorithm is used to accurately locate the position of the slit shadows on the first and second detectors on the continuous sensor, and thus provide a continuous position for the reference body such as the sun. The second periodic sensor has a patterned detector mask positioned over a very small area detector for producing periodic positional updates which information can be used to correct the continuous sensor errors and provide an accurate analog sun position sensor.

7 Claims, 6 Drawing Sheets

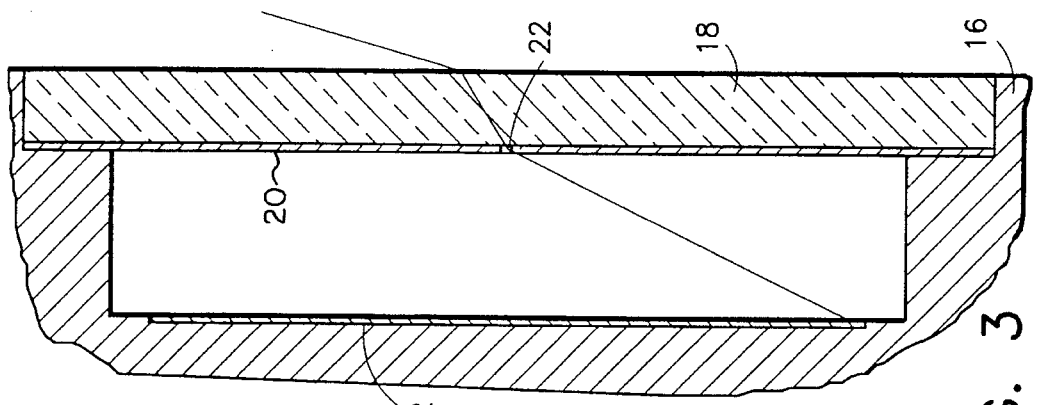
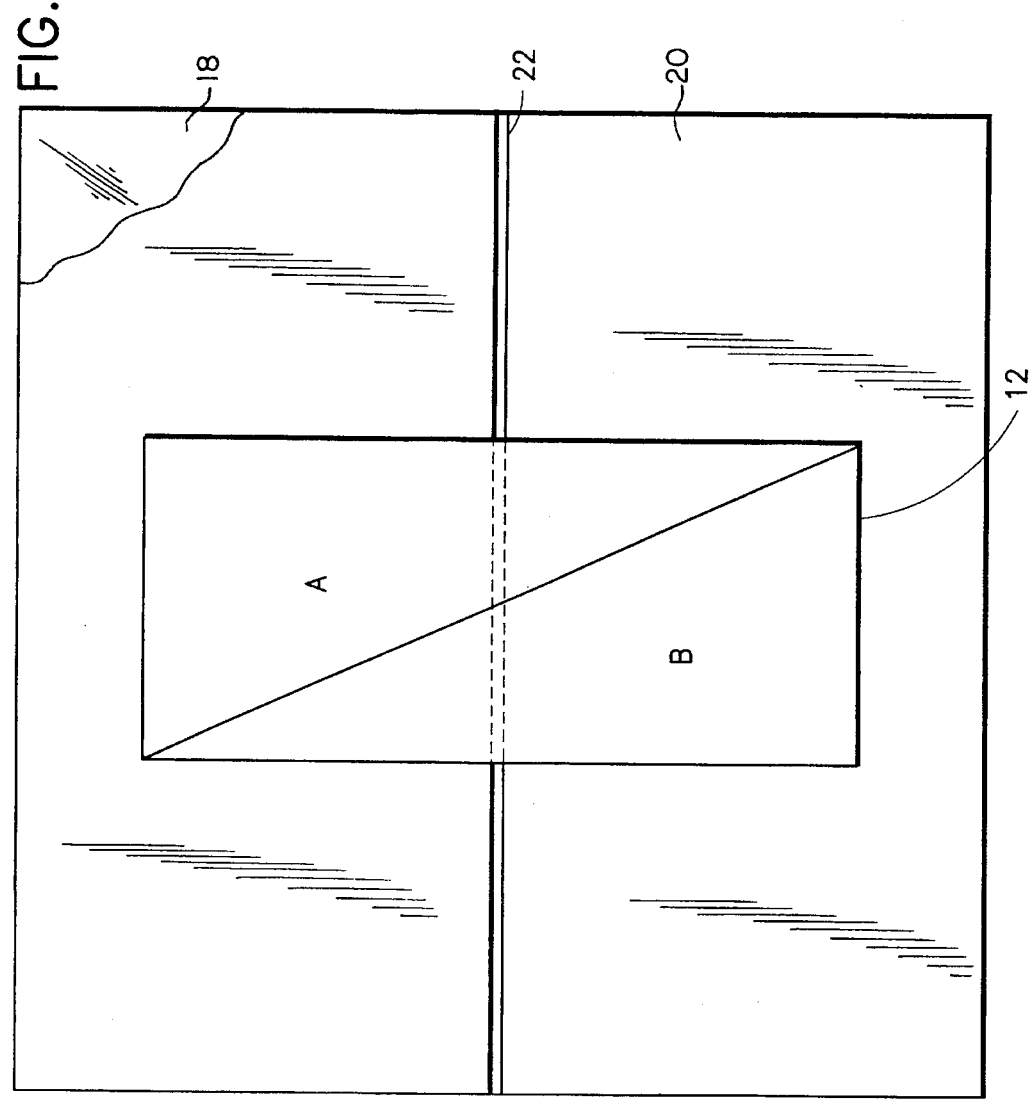

ANALOG SUN SENSOR

BACKGROUND OF THE INVENTION

This invention relates to attitude sensors for determining attitude information for an orbiting body, and more particularly, to a sun sensor for sensing the position of an orbiting body using an analog sun sensor in the form of a continuous sensor which is periodically updated by a patterned mask, periodic analog sun sensor that creates one or more narrow fields of view for detecting the sun as it passes therethrough, thereby precisely providing the position of the sun at a given time which is used to correct the position provided by the continuous sensor.

Attitude sensors are devices mounted on an orbiting body such as satellites, missiles, space probes, extremely high flying aircraft and the like which sense a reference body and produce a signal which indicates orientation of the orbiting body with respect to the reference body. The attitude of the orbiting body, which generally orbits the earth, is determined by its position with respect to three axes at right angles to each other, two of which are in a plane at right angles to a projected radius of the earth passing through the orbiting body which plane is parallel to the earth's horizon. Conical scan horizon sensors are frequently used in spacecraft to determine pitch and roll attitude by sensing the position of the earth's horizon in several directions. The third axis called yaw is an attitude around an axis through the center of the earth which cannot be obtained from the horizon data, and accordingly, observations of some other celestial body or object, usually the sun, are required.

Sun sensors for providing yaw used on spacecraft generally fall into two categories, one being analog devices which are typically low cost and low precision. The second being digital devices which are typically high cost and high precision, but are generally complex and require additional weight and power which are undesirable features.

SUMMARY OF THE INVENTION

Accordingly, it is an object of this invention to provide a new and improved analog sensor for providing sun position information for an orbiting body which is low cost with high accuracy.

A further object of this invention is to provide a new and improved analog sun sensor which is capable of providing accurate sun position information without substantially increasing the power and weight requirements for the orbiting body on which it is mounted.

A further object of this invention is to provide a new and improved continuous sun sensor having a slit aperture whose position may be accurately located on the sensor.

Another object of this invention is to provide a new and improved periodic sun sensor utilizing a very small area detector, which is extremely accurate and which may be utilized to update and correct the continuous sensor.

Yet another object of this invention is to provide a new and improved sun sensor which can provide either single or two axis information of the sun's position with respect to that of the orbiting body.

In carrying out this invention in one illustrative embodiment thereof, an attitude sensor for providing continuous positional information for an orbiting body such as a spacecraft, satellite or the like with respect to a reference body is provided having a first continuous sensor for continually viewing the reference body, such as the sun, from an orbiting body and generating electrical signals which provide two axis information with respect to the reference body. A second periodic sensor having a patterned mask positioned over a very small area detector produces periodic electrical signals over a shorter time frame. Signals from the second periodic sensor are utilized for calibrating the positional information provided by the first continuous sensor.

The first sensor is preferably a pair of double triangle detectors formed into rectangles, each having a slit aperture thereon, with the detectors positioned orthogonally with respect to each other.

The second sensor has a small area detector mounted behind a patterned mask which produces electrical signals by the apparent motion of the sun through the mask over the small area detector.

Among the many advantages of the present invention are that the output from the two sensors can be combined in the same package to provide a corrected output, or the sensors may be housed in separate packages and combined using the same electronics and on-board computer of the spacecraft, thereby providing increased accuracy without incurring substantial additional weight or power requirements.

BRIEF DESCRIPTION OF THE DRAWINGS

The invention, together with further objects, aspects, features and advantages thereof, will be more clearly understood from the following description taken in connection with the accompanying drawings.

FIG. 2 is a top plan view of a double triangle detector which is part of the continuous sun sensor.

FIG. 3 is a side elevational view of FIG. 2.

DESCRIPTION OF THE PREFERRED EMBODIMENTS

The analog attitude sensor in accordance with the present invention is positioned on an orbiting body such as a spacecraft, satellite, missile or the like for providing positional information with respect to a reference body, for example, the sun. For purposes of the present invention, the reference body described is that of the sun but the present invention is not considered restricted thereto. Normally, the analog attitude sensor described will be a complimentary device for another type of horizon sensor which provides pitch and roll information and may be incorporated therein.

The analog attitude sensor described herein may also be used as a stand-alone unit which provides full time yaw information and may be integrated into any spacecraft attitude determination system. In the description that follows, the analog sun sensor is described for use at geosynchronous orbits. However, the same hardware may be used to provide sun or other reference body sensing capabilities at all spacecraft altitudes by the appropriate transformation of position data.

Figure 1:
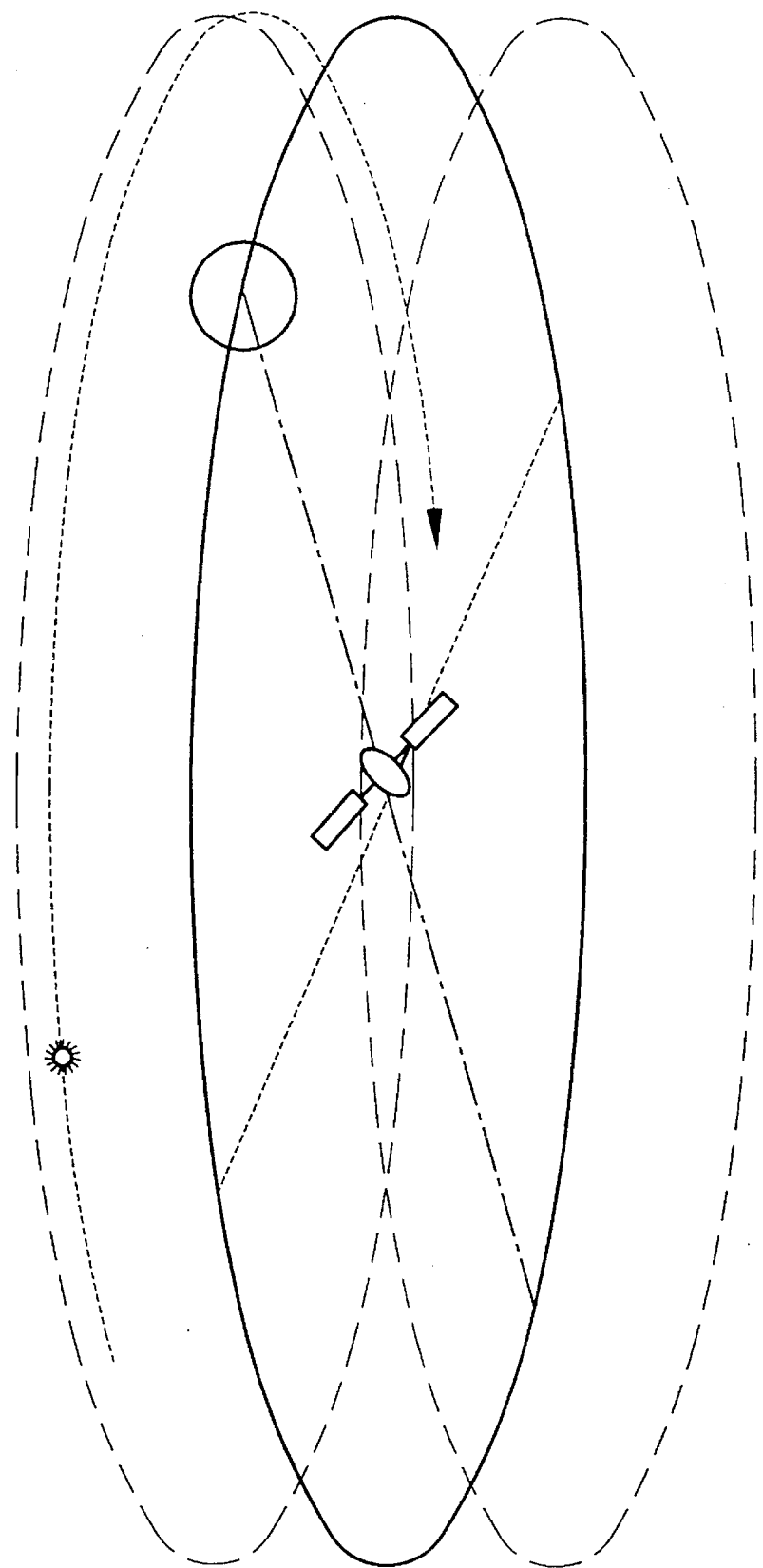
FIG. 1 shows a diagram of the relative orbits of the sun, earth and satellite for geosynchronous operation.

FIG. 1 illustrates the relative orbits of the sun, earth and satellite for a geosynchronous operation. In the case of geosynchronous orbits, the sun sensor of the present invention utilizes the fact that the apparent motion of the sun around the spacecraft occurs in a regular, easily definable manner. Such motion occurs exclusively parallel to the equatorial plane, so that periodic use of the sun at known spacing can be correlated through knowledge of time of day to spacecraft attitude. However, it should be understood that the present invention is not limited to geosynchronous orbits. Such orbits represent the simplest geometry for illustrating the method of operation of the present invention.

In the geosynchronous orbit shown in FIG. 1, the motion of the sun and the earth are shown relative to the spacecraft. Over the course of one year, the sun can transition from approximately 23.5° above the equator to 23.5° below it. At any instant, however, the sun's relative motion appears to be exactly parallel to the equatorial plane, so that the motion during one day can be considered to occur exclusively around the pitch axis and at a constant angular velocity.

Assuming that an earth sensor is used to provide real time pitch and roll data, then the sun sensor in accordance with the present invention may be used for providing real time yaw data. The sun is viewed with an analog sensor which provides two axis information regarding the sun's position. These axes called sun elevation azimuth are translated into spacecraft yaw by correlating the outputs of the sun sensor and the earth sensor. It should be understood, however, that the sun sensor of the present invention may be used either individually or in combination with other sensors.

Figure 4:
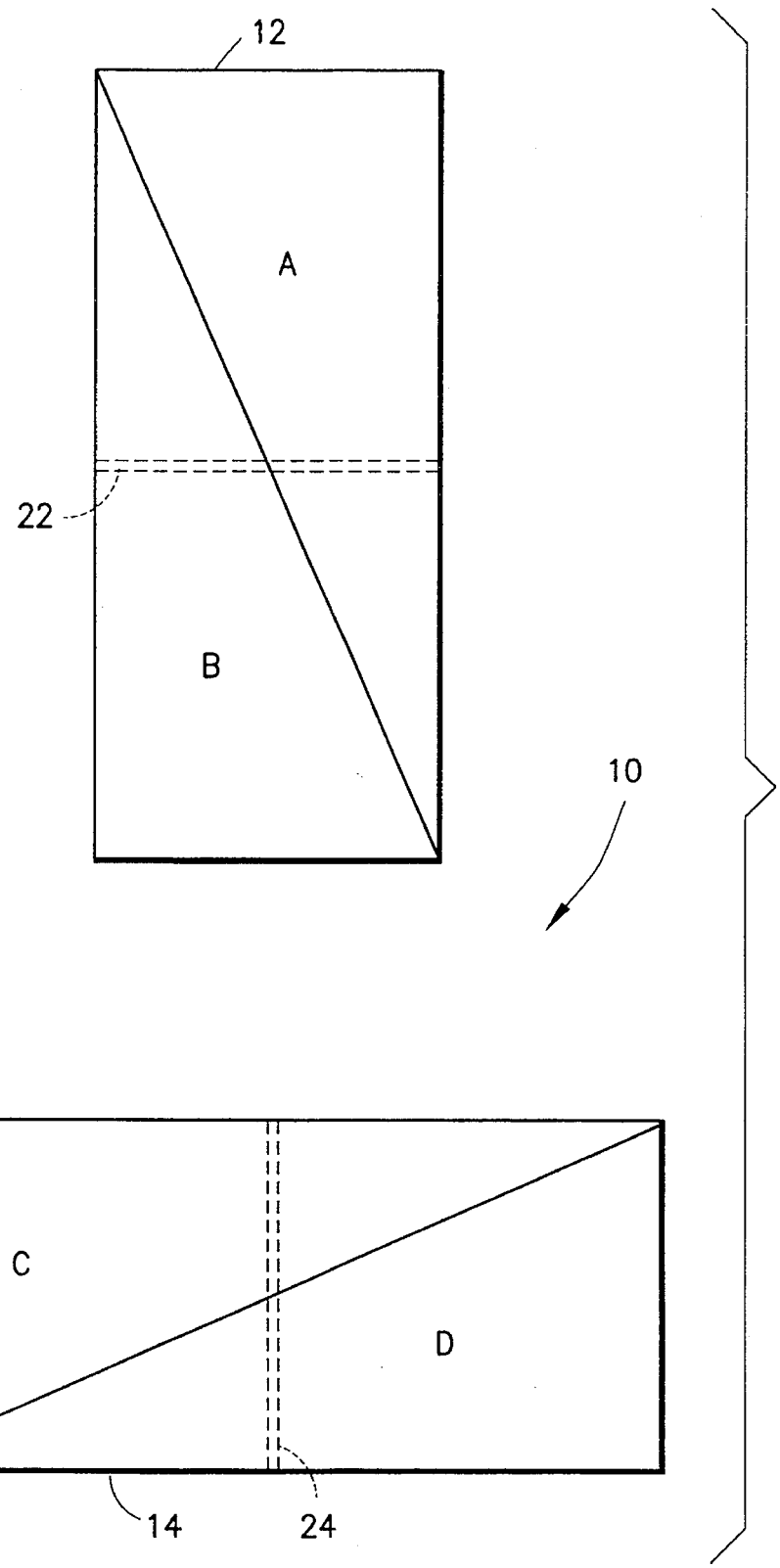
FIG. 4 illustrates the continuous sun sensor in accordance with the present invention utilizing a pair of double triangle detectors of the type shown in FIG. 2 oriented orthogonally with respect to each other.

Continuous sun position monitoring capability is provided in the present invention by a pair of double triangle detectors 12 and 14 forming the continuous sensor 10. The sensor 10 includes detector 12 formed from triangular detectors A and B, and detector 14 formed by triangle detectors C and D arranged to form rectangles, as shown in FIG. 4. The detectors may be silicon or any other material such as gallium arsenide which is responsive to the radiation of the reference body in question, which in the illustrated embodiment is the sun.

The construction of the double triangle detectors 12 and 14 are the same but are oriented orthogonally as shown in FIG. 4 with respect to each other in order to provide the sun's position in both azimuth and elevation. Referring now to FIGS. 2 and 3, the triangle detector 12 is positioned in a housing 16 behind a glass plate 18 having a mask 20 deposited on the back surface thereof with a slot 22 therein. The slot aperture 22 projects a slot image normal to the sides of the rectangle formed by double triangle detector 12, as shown in FIG. 2. The slot 22 permits the detector to receive radiation from the sun through the slot 22 of mask 20. As will be seen in FIG. 4, detector 14 has a slot 24 which is also normal to the longer side of the rectangles formed by triangle detectors C and D of detector 14 and function in a manner similar to detector 12.

In order to provide two axis sun position information, a locator algorithm for the continuous sun sensor 10 uses the differences in the output of each detector A, B, C and D to determine the sun's position in azimuth and elevation relative to the coordinant axis of the sun sensor. With the detector configuration as shown in FIG. 4, the following transfer function calculates the physical position of the images of the slits 22 and on the sensor 10.

$$x = \frac{D - C}{D + C}$$

$$y = \frac{A - B}{A + B}$$

where A, B, C, D are the voltage ouputs of the respective cells of the detector x, y are fractional distances to the edge of the detector The azimuth and elevation position of the sun can then be calculated with the following equations:

$$\text{azimuth} = \tan^{-1}\left(\frac{x \times s}{2h}\right)$$

$$\text{elevation} = \tan^{-1}\left(\frac{y \times s}{2h}\right)$$

where s=the length of one side of the detector h=the height of the aperture mask above the detector The problem with this type of sensor which is similar to other two axis analog sun sensors is that such a sensor is subject to long-term degradation due to aging, stress and radiation damage. In addition, the sensor's wide field of view permits slow changes in the sun position to result in a potential for differing amounts of glint and reflection from spacecraft components to enter into detectors, thus affecting their output. However, the sensor can provide excellent relative sun position.

The continuous sun sensor illustrated in the form of the sensor 10 can suffer from poor performance as pointed out previously by degradation due to environmental aging and radiation effects as well as transfer function nonlinearity which and can be corrected by providing periodic positional updates using the sun itself or other celestial bodies. The updates can provide instantaneous positional snapshots in one or two axes and can be updated by varied periodicity for correcting the continuous sun sensor output. The use of the sun as a reference allows the direct comparison of sun position with that of the output of the continuous sensor. The use of any other reference requires an appropriate transformation of position data.

Figure 6:
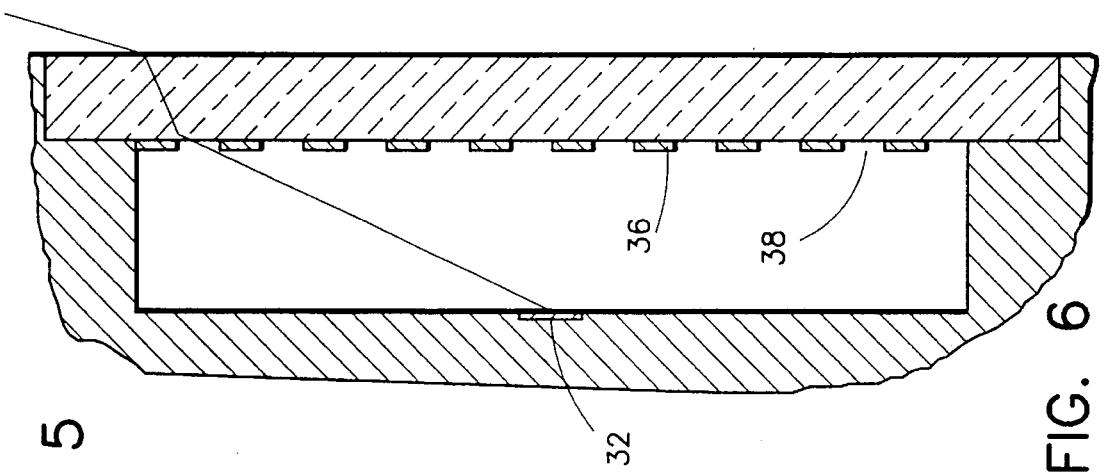
FIG. 6 is a side elevational view of FIG. 5.
Figure 5:
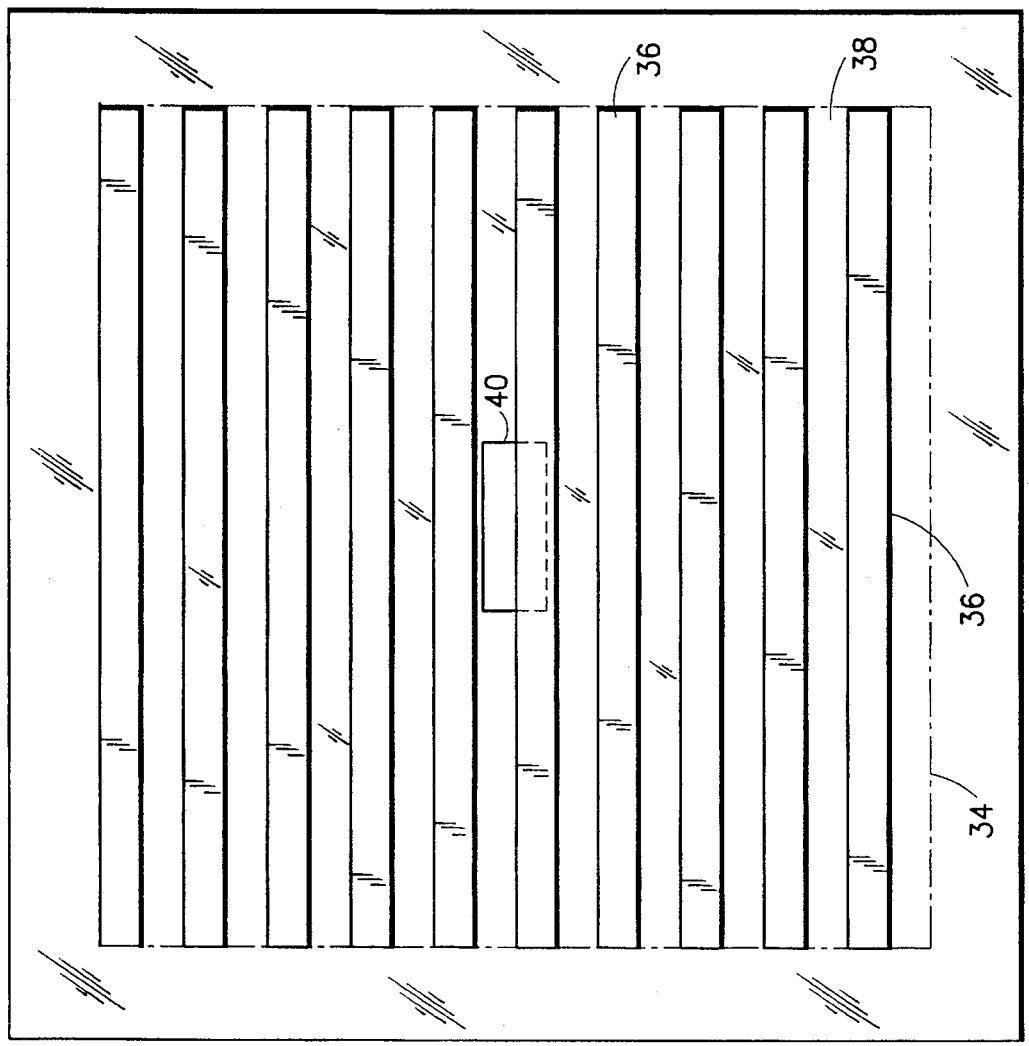
FIG. 5 is a top elevational view of a detector used in the periodic sensor of the present invention.
Figure 7:
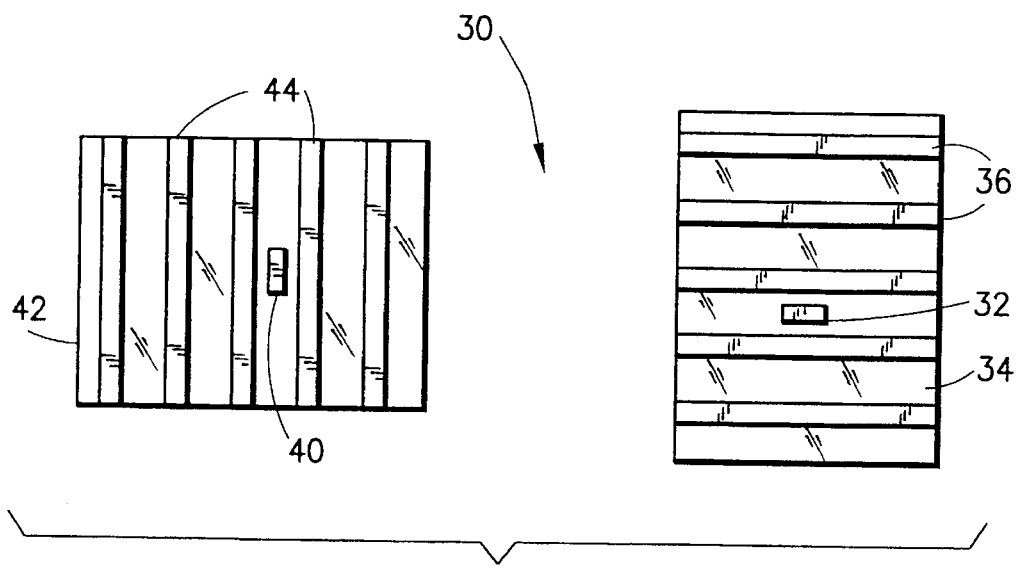
FIG. 7 is a diagrammatic illustration of the periodic sensor of the present invention using a pair of masked, very small area detectors of the type shown in FIG. 5 disposed orthogonally with respect to each other.

The type of periodic sensor to provide the updates or correction of the continuous sensor 10 is illustrated in one form in FIGS. 5–7. The periodic sensor, referred to generally with the reference character 30, includes a very small area detector 32, a photomask 34 having a pattern of straight parallel bars 36 separated by one or more transparent slots 38 on a glass slide 40. The detector 32 must be responsive to the radiation from the reference body, and as an example, for the sun's radiation, a simple silicon area detector may be utilized. The photomask 34 serves the function of providing a matrix of correction point or points by combining a series of long, narrow bars 36 with the motion of the sun projected through the slots 38 onto the detector 32.

The pattern of straight parallel bars 36 are spaced so that the trailing edges subtend equal angular movements. The spacing will be determined by the distance between the patterned mask 34 and the detector 32, as well as the angular accuracy of the continuous sensor 10. The greater the number of bars 36 used in the calibration provides more calibration points; however, it becomes increasingly difficult for the continuous sensor 10 to identify the bar. Ultimately, the bar spacing will be limited by diffraction. In an illustrative implementation, the bars 36 will be spaced to subtend equal angular increments at the detector 32 over the field of view, which because of foreshortening widens the bars toward either edge. However, different algorithms may be used to implement various patterns of width and spacing of the bars. It should also be understood that the mask 34 may have only one open slot 38 which would provide one calibration per cycle.

In order to provide two axis correction, the periodic sensor 30 includes the patterned mask 34 having horizontally spaced bars 36 and a second detector, very small area detector 40, positioned behind patterned mask 42 have vertically spaced straight parallel bars. The detector 32 provides precise measurements in the sun's position in elevation while detector 40 provides a periodic output that varies only in the azimuth axis based on the sdn's relative movement across the vertical bars 44.

Thus, by providing two periodic detectors 32 and 40, one using horizontal bars and the other utilizing vertical bars as shown in FIG. 7, two axis correction may be provided for the sun's position. The use of the two periodic detectors 32 and 40 generate fields of view consisting of numerous long, narrow slots imaged on the detectors which guarantees the sun's crossings at sharp angles and keeps the implementation very simple. The output from the detectors 32 and 40 are then utilized to update the accuracy of the continuous sensor 10.

Figure 8:
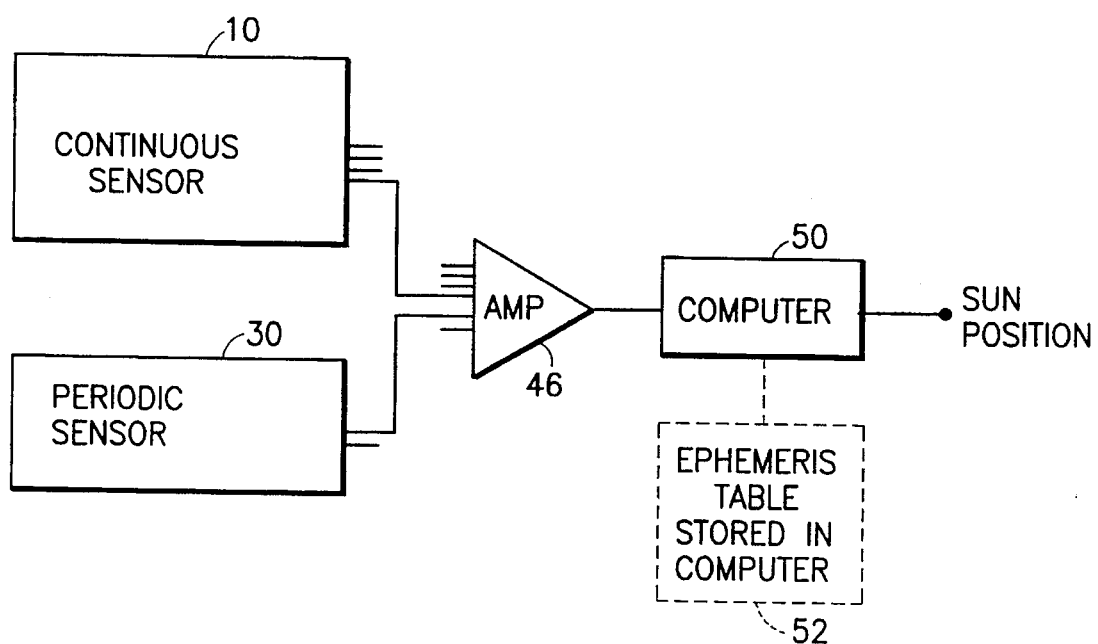
FIG. 8 is a block diagram illustrating one form of processing using a single amplifier and an on board computer for providing accurate yaw information for the spacecraft.

As will be seen in FIG. 8, the output from the continuous sensor 10 which may include up to three sets of continuous type sensors such as the double triangle detectors described in FIG. 4 or in fact may include other types of analog sun detectors, such as a cosine detector. The periodic sensors 30 which may include at least two sets of detectors such as described in connection with FIG. 7 have their outputs applied to a common amplifier 46 and to an on-board spacecraft computer 50 which includes and has stored therein ephemeris table 52 which may be utilized along with the outputs of the sensors for determining sun position and/or yaw of the spacecraft.

Figure 9:
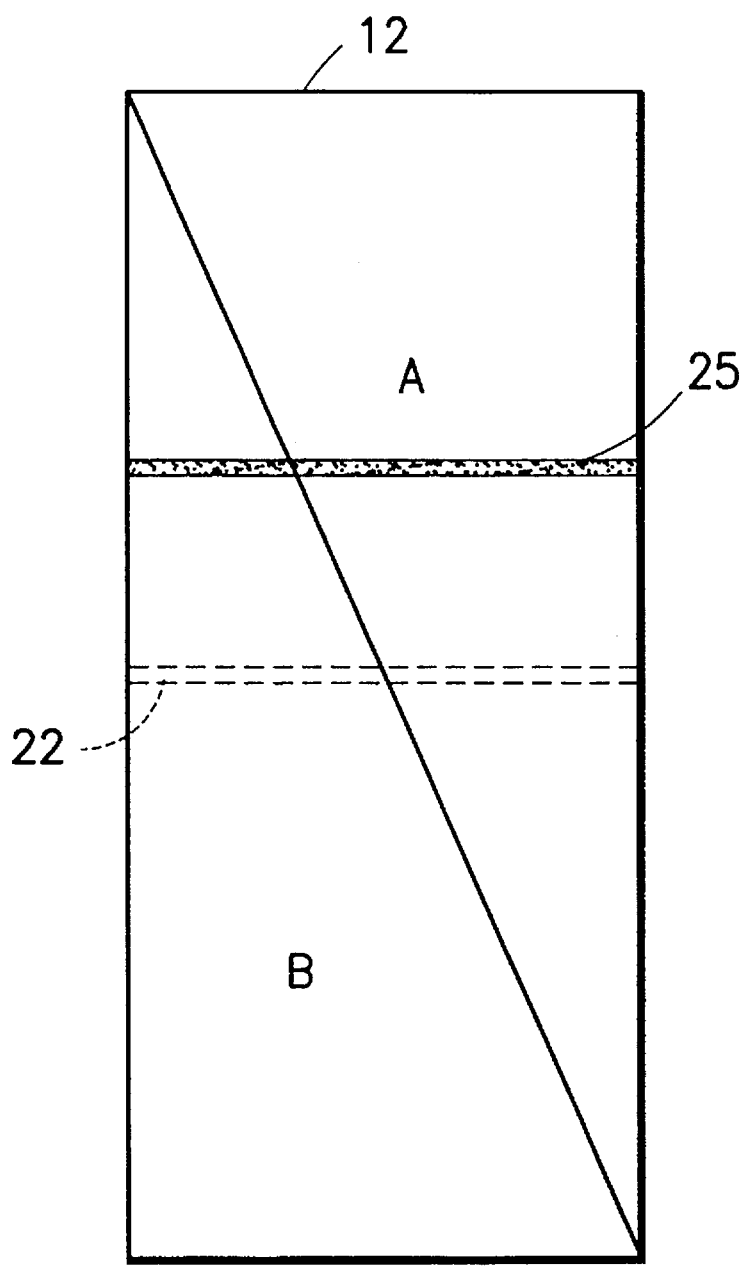
FIG. 9 is similar to FIG. 4, illustrating another embodiment in which the continuous and periodic sensors are combined.

As is illustrated in FIG. 9, the continuous and periodic sensors may be combined. This is accomplished by placing one opaque bar 25 in the plane of detector 12 parallel to the sun shadow slot 22. When the sun shadow crosses opaque bar 25, the signal generated by the sensor 12 will go to zero for a short interval, thus calibrating triangle detectors A and B at a known angular position, i.e., just after the sun shadow re-emerges. Sensor 14 is provided with a similar opaque bar parallel to slot 24 on triangle detectors C and D (not shown).

Accordingly, a very simple low cost detector structure is provided which may be utilized separately or in common with other spacecraft attitude systems for providing accurate reference body position and/or yaw information utilizing a reference body, such as the sun. The detectors are simple in construction, provide a continuous monitoring of the sun which is periodically updated to eliminate non-linearities normally associated with analog type sun sensors. Unlike digital sensors, the analog sensors are less complex, require less power and are considerably inexpensive as compared with digital type devices which add weight and power requirements to the spacecraft. The analog sun sensors in accordance with the present invention may be housed together or in separate configurations which when combined, provide highly accurate sun position in two axes, both elevation and azimuth, which compares favorably with the accuracy achieved by comparable digital sensors.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. An attitude sensor for providing continuous positional information for an orbiting body such as a spacecraft, satellite or the like with respect to a reference body comprising:

a first continuous sensor continuously viewing a reference body from said orbiting body for generating electrical signals in a predetermined time frame which provide two axis information with respect to the reference body, a second periodic sensor means directed at said reference body from said orbiting body having patterned mask means covering said periodic sensor means for producing periodic electrical signals over a shorter time frame than said electrical signals generated in said predetermined time frame by said first continuous sensor, means for combining said electrical signals from said first continuous sensor and said periodic electrical signals from said second periodic sensor means for periodically calibrating the two axis information provided by said first sensor to correct for errors in the two axis information provided by said first sensor.

2. The attitude sensor as claimed in claim 1 wherein said first continuous sensor comprises a pair of double triangle detectors arranged to form a rectangle, a slit aperture mask mounted in a housing for said first sensor, said aperture mask projecting a line image normal to said rectangle formed by said triangular detectors.

3. The attitude sensor as claimed in claim 1 wherein said second periodic sensor means comprises:

a small area detector means sensitive to radiation emitted by the reference body, a patterned detector mask spaced in front of said small area detector means having at least one open slot therein.

4. The attitude sensor as claimed in claim 3 wherein said second periodic sensor means includes two separate small area detectors each having a patterned mask, one of said masks comprising a series of spaced parallel horizontal bars for providing the reference body's position in elevation, the other of said masks comprising a series of spaced parallel vertical bars for providing the reference body's position in azimuth.

5. The attitude sensor as claimed in claim 2 wherein said second periodic sensor means comprises:

a small area detector means sensitive to radiation emitted by the reference body, and a patterned detector mask spaced in front of said small area detector means.

6. The attitude sensor as claimed in claim 5 wherein said second periodic sensor means includes two separate detectors each having a patterned mask, one of said masks comprising a series of spaced parallel horizontal bars for providing the reference body's position in elevation, the other of said masks comprising a series of spaced parallel vertical bars for providing the reference body's position in azimuth.

7. The attitude sensor as claimed in claim 1 wherein said first continuous sensor and said second periodic sensors have common detector means, said periodic sensors comprising a single opaque bar in the plane of said common detector means for periodically blocking said common detector means view of said reference body, thereby reducing the detector means signal to zero for a short interval for calibrating said detector means at a known predetermined angular position.

* * * * *